United States Patent [19]

Saimi et al.

[11] Patent Number: 5,151,889
[45] Date of Patent: Sep. 29, 1992

[54] OPTICAL HEAD DEVICE USING CROSS-POLARIZED FROM A LIGHT SOURCE FOR USE IN OPTICAL DISK SYSTEM

[75] Inventors: Tetsuo Saimi; Kazuo Momoo, both of Osaka, Japan

[73] Assignee: Matsushita Electric Industrial Co., Ltd., Osaka, Japan

[21] Appl. No.: 467,119

[22] Filed: Jan. 19, 1990

[30] Foreign Application Priority Data

Jan. 20, 1989 [JP] Japan .................................... 1-12328
Jan. 20, 1989 [JP] Japan .................................... 1-12329

[51] Int. Cl.⁵ .............................................. G11B 7/00
[52] U.S. Cl. .............................. 369/44.37; 369/44.14; 369/112
[58] Field of Search ............... 369/44.14, 44.37, 44.38, 369/44.41, 110, 112

[56] References Cited

U.S. PATENT DOCUMENTS 4,694,447 9/1987 Cohen et al. .................... 369/112 X
5,036,504 7/1991 Ono et al. ...................... 369/44.12 X

FOREIGN PATENT DOCUMENTS 201917 11/1986 European Pat. Off. .
258450 3/1988 European Pat. Off. .
339722 11/1989 European Pat. Off. .

OTHER PUBLICATIONS

Topical Meeting on Optical Data Storage, Mar. 11, 1987, Stateline, Nev.

Westney & Swaby: "Disk Drive Optics: Design Factors affecting manufacturing and cost in volume".

*Primary Examiner*—Robert L. Richardson
*Attorney, Agent, or Firm*—Pollock, Vande Sande & Priddy

[57] ABSTRACT

An optical head system for optically recording and reproducing information on and from an optical recording medium. The optical head system comprises a light source for emitting a light beam, a collimator lens for causing the light beam from the light source means to become a parallel light beam, and an objective lens for converging the parallel light beam from the collimator lens on the optical recording medium. Between said collimator lens and the objective lens is provided a first optical device for reflecting the light beam returning from the optical recording medium. Also included is a second optical device for separating the light beam from the first optical device to generate two light beams, the two separated light beams directing in the substantially same direction and being separated by a predetermined distance from each other. The two separated light beams from said second optical device are separately incident on a photodetector assembly. The photodetector assembly comprises first and second light-receiving portions which are placed on a common substrate. One of the two separated light beam is incident on the first light-receiving portion so as to obtain a focus error signal and the other separated light beam is incident on the second light-receiving portion so as to obtain a tracking error signal.

8 Claims, 7 Drawing Sheets

OPTICAL HEAD DEVICE USING CROSS-POLARIZED FROM A LIGHT SOURCE FOR USE IN OPTICAL DISK SYSTEM

BACKGROUND OF THE INVENTION

The present invention relates to an optical head device or an optical pickup device used for optical disk systems to optically perform recording, reproduction and erasure of information such as data, image and music.

An important problem in the optical recording and reproducing art relates to the need for an optical head device which can be manufactured with a simple structure and at as low cost as possible. Generally, for optical recording and reproduction of information, a focus error signal and a tracking error signal are detected on the basis of light spots formed on photodetectors by light beams from an optical recording medium such as an optical disk. The diameters of the spots of beams for the detection of the focus error signal and the detection of the tracking error signal are required to be different from each other, thereby requiring provision of two photodetectors at different positions. The provision of the two photodetectors at the different positions causes complication of the arrangement of the optical system, and this can result in deterioration of the detection accuracy concurrent with increase in the manufacturing cost. Thus, a further improvement in terms of the arrangement of the optical head device would be required from the viewpoint of decrease in the manufacturing cost.

SUMMARY OF THE INVENTION

It is therefore an object of the present invention to provide an optical head device or an optical pickup device for use in an optical disk system which has a simple structure to reduce the manufacturing cost.

With this and other objects which will become apparent as the description proceeds, according to the present invention, an optical head device is described for optically recording and reproducing information on and from an optical recording medium, comprising: light source means for emitting a light beam; collimator means for causing the light beam from the light source means to become a parallel light beam; objective lens means for converging the parallel light beam from the collimator means on the optical recording medium; first optical means provided between the collimator means and the objective lens means for reflecting the light beam returned from the optical recording medium; converging means for converging the light beam reflected by the first optical means; second optical means for separating the light beam from the converging means to generate two light beams which are optically cross-polarized, the two separated light beams directing in substantially the same direction and being separated by a predetermined distance from each other; and photodetector means for respectively receiving the two separated light beams from the second optical means.

Here, the second optical means is arranged to cause the optical path length of one of the two separated light beams to be longer than that of the other separated light beam.

Preferably, the optical head device further comprises third optical means provided between the second optical means and the photodetector means for dividing one of the two separated light beams from the second optical means into two light beams which are separately incident on the photodetector means and for transmitting the other separated light beam which is directly incident thereon. The third optical means is arranged so that the optical path length of one of the two divided light beams is longer than that of the other divided light beam. Further, the photodetector means is composed of a substrate and first and second light-receiving portions placed on the substrate, the first light-receiving portion being divided along a line into two portions and the second light-receiving portion comprises two sections each of which is divided along two parallel lines into three portions. The first and light-receiving portions are provided such that the division line of the first light-receiving portion is perpendicular to the two parallel division lines of the second light-receiving portion.

In accordance with the present invention, there is further provided an optical head device for optically recording and reproducing information on and from an optical recording medium, comprising: light source means for emitting a light beam; collimator means for causing the light beam from the light source means to become a parallel light beam; objective lens means for converging the parallel light beam from the collimator means on the optical recording medium; first optical means provided between the collimator means and the objective lens means for reflecting the light beam returned from the optical recording medium; second optical means for separating the light beam from the first optical means to generate two light beams which are optically cross-polarized; third optical means for reflecting the two separated light beams so as to be separated from each other and direct in substantially the same direction; and photodetector means for respectively receiving the two separated light beams from the third optical means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Prior to describing the embodiments of the present invention, a brief description will be made in terms of a prior art optical head device with reference to FIG. 1 for a better understanding of this invention.

Figure 1:
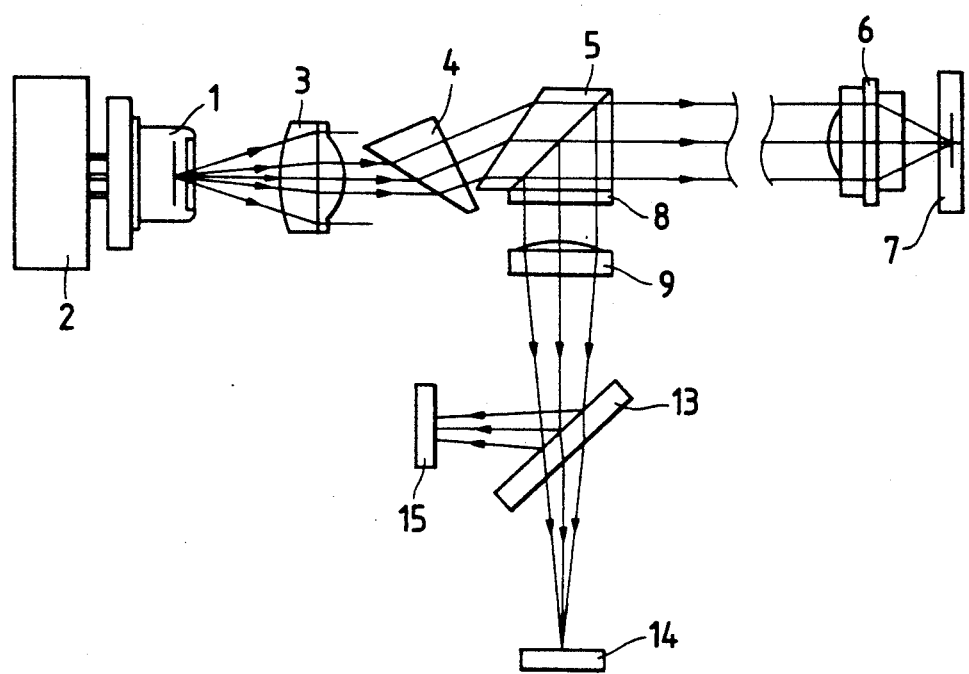
FIG. 1 is an illustration of a conventional optical head device.

FIG. 1 is an illustration of an arrangement of a conventional optical head device comprising a semiconductor laser 1 coupled to a high-frequency module 2 which is operable only during a reproducing operation so as to modulate a laser beam emitted from the semiconductor laser 1 with a frequency of 600 to 800 MHz to improve the S/N ratio of the reproduction signal. This high-frequency module 2 is encased in a metallic case which is in earth connection with a case of the semiconductor laser 1 and a housing of the optical head device by means of the soldering. The laser beam from the semiconductor laser 1 first directs to a collimator lens 3 so as to be substantially collimated, then advances toward a wedge prism 4 and a polarizing prism 5 whereby the laser beam is enlarged in one direction. Generally, the laser beam is enlarged up to 2.2 to 2.6 times. After passing through the polarizing prism 5, the laser beam is focused on an optical disk 7 by means of an objective lens 6. A beam reflected from the optical disk 7 returns to the objective lens 6 and the polarizing prism 5 where the beam from the optical disk 7 is reflected. Here, in the case of recording and reproduction of a magneto-optical signal, the polarizing prism 5 may be arranged such that the rate of transmission of the P-polarization is 60 to 80%; the rate of transmission of the S-polarization is below 1%, the rate of reflection of the P-polarization is 20 to 40%; and the rate of reflection of the S-polarization is above 98%. Illustrated at numeral 8 is a half-wave plate which is, if required, provided in view of an arrangement of the optical system.

After being condensed by a focus detection lens 9, the reflected beam due to the polarizing prism 5 is incident on a plane parallel plate 13 which separates the incident beam into P-polarization and S-polarization. The beam (P-polarization) passing through the plane parallel plate 13 generates astigmatism and reaches a first photodetector 14 where a focus error signal can be obtained in accordance with a well known technique such as an astigmatic method. On the other hand, the beam (S-polarization) reflected at the plane parallel plate 13 is incident on a second photodetector 15 where a tracking error signal can be obtained in accordance with a so-called far-field technique. A magneto-optical signal can be obtained on the basis of the difference between the outputs of the first and second photodetectors 14 and 15.

Such an arrangement of the optical head device requires provision of the two photodetectors 14 and 15 at different positions, because of the difference between the diameters of the beam spots necessary for the detections of the focus error signal and tracking error signal in addition to separation of the P-polarization and S-polarization in different directions. That is, in the case of obtaining the tracking error signal in accordance with the far-field technique, if taking into account the drift and temperature stability, it is preferable that the diameter of a beam spot formed on the photodetector 15 is in a range from about 400 micrometers to 1.5 millimeters, because increase in the area of the photodetector 15 causes deterioration of the frequency characteristic. Similarly, it is preferable that the diameter of a beam spot formed on the photodetector 14 exits in a range from 50 to 250 micrometers, in order to prevent of deterioration of the detection sensitivity and to lower of the S/N ratio. Moreover, in the detection of the focus error signal due to the astigmatic technique, the plane parallel plate 13 causes generation of a spherical aberration and coma aberration concurrent with the generation of the astigmatism. These aberrations cause a complex optical path whereby track-crossing noises are produced when a light beam crosses track channels of the optical disk 7. These noises can be introduced into the focus error signal.

Figure 2:
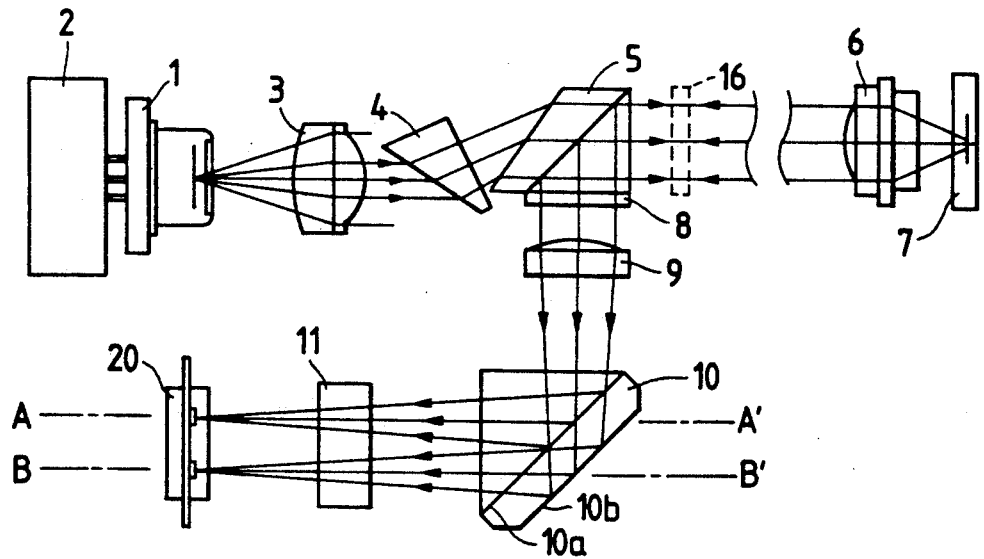
FIG. 2 is an illustration of an arrangement of an optical head according to a first embodiment of the present invention.

Referring now to FIG. 2, there is illustrated an optical head device according to an embodiment of the present invention. In FIG. 2, parts corresponding to those in FIG. 1 are marked with the same reference numerals. Similarly, the optical head device of this embodiment comprises a semiconductor laser 1 coupled to a high-frequency module 2 operated only during a reproducing operation so as to modulate a laser beam emitted from the semiconductor laser 1 with a predetermined frequency to improve the S/N ratio of the reproduction signal. The laser beam from the semiconductor laser 1 passes through a collimator lens 3 to then advance into a wedge prism 4 and a first polarizing prism 5. After passing through the first polarizing prism 5, the laser beam is focused on an optical disk 7 through an objective lens 6. A beam reflected from the optical disk 7 returns to the objective lens 6 and reaches the first polarizing prism 5 where the beam from the optical disk 7 is reflected so as to pass through a half-wave plate 8 to be rotated so that the polarizing direction takes 45°. This half-wave plate 8 is provided in order to make simple the configuration of the optical 15 system. If it were not provided, the optical system (10 to 12, 12') to be located after the first polarizing prism 5 would rotated by 45° about the optical axis.

After passing through the half-wave plate 8 and further a detection lens 9 which condenses the beam from the half-wave plate 8, the beam reaches a second polarizing prism 10 for separation to the P-polarization and the S-polarization. The second polarizing prism 10 acts as a polarized beam splitter and hence has a first polarizing film 10a and a second polarizing film (or reflection surface) 10b which are provided so as to make a predetermined angle with respect to the optical axis of the light beam from the detection lens 9. Thus the S-polarization is reflected by the first polarizing film 10a so as to direct along a line A—A' in FIG. 2 and the P-polarization is reflected by the second polarizing film 10b after transmission of the first polarizing film 10a so as to advance along a line B—B' in the same figure. Here, one important feature is that, due to the reflections at the first and second polarizing films 10a and 10b, the optical path length of the P-polarization becomes longer than that of the S-polarization. This can make a difference between the diameters of beam spots formed on a photodetector assembly 20 which will be described hereinafter. The line A—A' corresponds to the optical axis of the S-polarization and the line B—B' corresponds to the optical axis of the P-polarization. The S-polarization and P-polarization reflected at the second polarizing prism 10 respectively reach a third polarizing prism 11 which acts as a partial polarized beam splitter. The effect is that the transmission of the P-polarization, which is S-polarization in the prism 10 since the prisms 10 and 11 are arranged to be perpendicular to each other, is substantially 100%; the transmission of the S-polarization, which is P-polarization in the prism 11 because the prisms 10 and 11 are arranged to be perpendicular to each other, is about 50%; and the reflection of the S-polarization is about 50%. Thereafter, three beams formed by passing through the third polarizing prism 11 respectively reach the photodetector assembly 20. The photodetector assembly 20 comprises two photodetectors 12' and 12 for reception of light beams for detections of the tracking error signal and the focus error signal, the two photodetectors 12' and 12 being located on a common substrate (a wafer). The magneto-optical signal can be obtained by the difference between the outputs of the two photodetectors 12' and 12 due to the beams for the detections of the focus error signal and tracking error signal.

In this embodiment, the objective lens 6 is used an aspherical lens whose numerical aperture (N.A) is 0.53 and the detection lens 9 is used a single lens whose focal length is 30 millimeters. In this case, the distance between the optical axes A—A' and B—B' of the S-polarization and P-polarization is preferably determined to be about 3 millimeters, whereby it is possible to cause the beam spot for the far-field tracking to be above 400 micrometers.

Generally, for execution of the far-field tracking, a light beam from an optical recording medium is recieved by a photodetector means which is divided into two portions. The line for the division of the photodetector means is arranged to be in parallel to a track of the optical recording medium and to be positioned at the center of the far-field light beam. The tracking servo can be effected by operating an objective lens (6) in accordance with the outputs of the two-divided photodetector means as described in U.S. Pat. 4,491,940, for example. Other than the method of the division of the beam from the optical recording medium, there is a method which uses is a photodetector means having two slits which are arranged to be symmetrically positioned with respect to a line which is placed at the center of the beam and which extends in parallel to the track. This method can improve the defocus characteristic of a signal indicative of the track error as described in the Japanese Patent Provisional Publication No. 63-222333, for example. Here, the diameter of the beam for the detection of the tracking error signal is preferably in the range from 400 micrometers to 2 millimeters. That is, the position relation between the light beam and the photodetector means can be changed with the passage of time, conditions, and other variables, thereby resulting in variation of the difference between the outputs of the two-divided photodetector means. Thus, in order to stably perform the tracking servo, it is preferable that the diameter of the light beam spot formed on the photodetector means is as great as possible. On the other hand, if taking into account the frequency response characteristic, it is preferable that the area of the photodetector means for reception of the light beam be as small as possible. To obtain an excellent frequency response characteristic and an adequate signal-to-noise ratio, the beam receiving area thereof must generally be below about 2 millimeters.

Figure 3A:
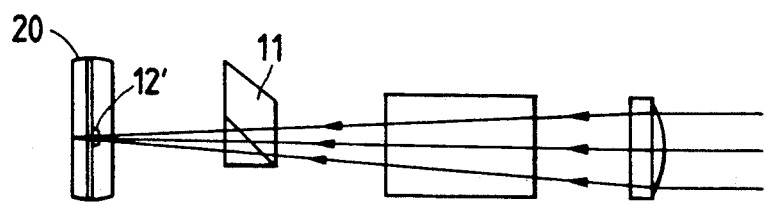
FIGS. 3A and 3B are partial cross-sectional views of the FIG. 2 optical head device.

Thus, according to this embodiment, as illustrated in FIG. 3A which is a cross-sectional view taken along the A—A' line in FIG. 2, the beam (S-polarization in the prism 10) for the detection of the far-field tracking error signal from the second polarizing prism 10 penetrates the third polarizing prism 11 and then reaches the photodetector assembly 20, so that the diameter of the beam spot formed on the photodetector 12' is between 400 micrometers and 1 millimeter, for example, about 470 micrometers.

Figure 3B:
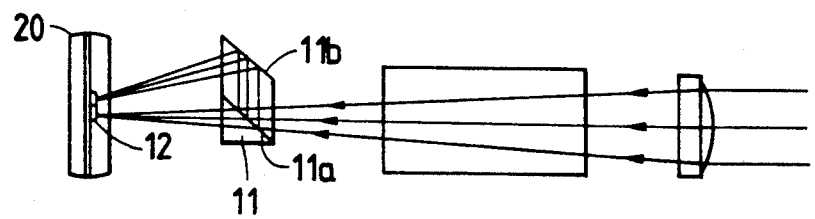

FIG. 3B is a cross-sectional view taken along the line B—B' in FIG. 2 and shows beams for the detection of the focus error signal. Here, as illustrated in FIG. 3B, the beam (P-polarization in the prism 10) from the second polarizing prism 10 is divided into two beams by means of the third polarizing prism 11. That is, the third polarizing prism 11 is arranged so that a portion (first divided beam) of the beam from the second polarizing prism 10 is directly transmitted to the photodetector 12 of the photodetector assembly 20 and the remaining portion (second divided beam) thereof is reflected at a polarizing film 11a and further reflected at a reflection surface 11b so as to advance to the same photodetector 12. Due to the reflections, the optical path length formed by the second divided beam becomes longer than the optical path length formed by the first divided beam, whereby the beam spots formed on the photodetector 12 by the first and second divided beams are different in diameter from each other.

Figure 4A:
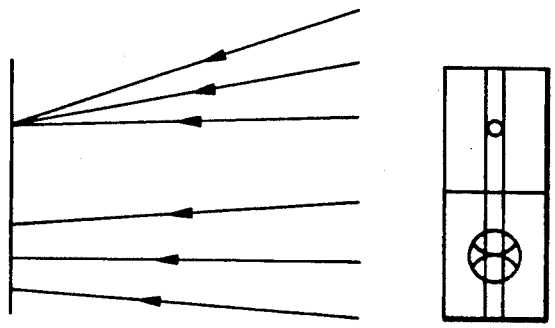
FIGS. 4A to 4C are illustrations of converging states of light beams to be incident on a photodetector assembly.
Figure 4B:
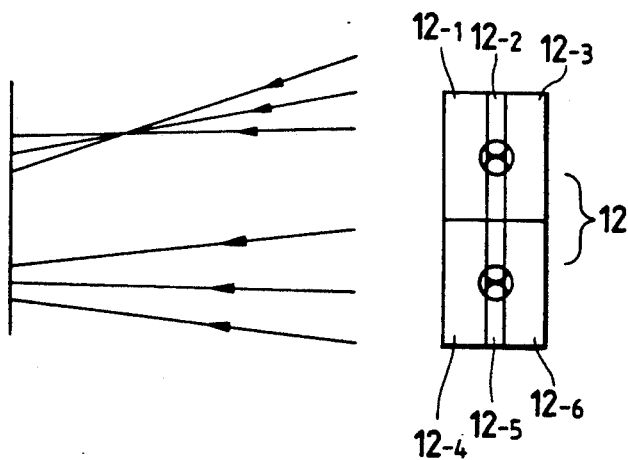
Figure 4C:
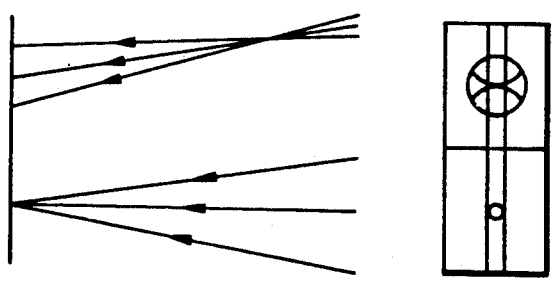

FIGS. 4A to 4C illustrate converging states of the first and second divided beams with respect to the photodetector 12. These converging states depend upon the focusing state of the laser beam with respect to the optical disk 7, FIG. 4A showing the objective lens 6 relatively close to the optical disk 7, FIG. 4B showing the objective lens 6 placed at a focusing position with respect to the optical disk 7, and FIG. 4C showing the objective lens 6 relatively away from the optical disk 7. The photodetector 12 comprises six portions 12-1 to 12-6 which are made by first dividing the photodetector 12 into three portions by two parallel lines and then further dividing it with a line normal to the two parallel lines. Here, since, as illustrated in FIG. 3B, one (upper side beam in FIGS. 4A to 4C) of the beams divided by the third polarizing prism 11 is obliquely incident on the photodetector 12, the beam spot to be formed thereon has a slightly elliptical configuration. Moreover, this oblique incidence causes generation of astigmatism. In this embodiment, for eliminating the effect of the astigmatism so as to adequately effect the focus error signal detection, the optical system is arranged so that the distance between the two beam spots on the photodetector 12 is about 1 millimeter, and, in the case of the focusing state (the state of FIG. 4B), the upper side beam spot has a long diameter of about 240 micrometers and a short diameter of about 200 micrometers and the lower side beam spot has a diameter of about 200 micrometers. The long axis of the upper side beam spot extends in the longitudinal directions of the photodetector 12. The width of the portions 12-2 or 12-5 is preferably to be in the range from 40 to 100 micrometers, and in this embodiment, it is determined to be 80 micrometers.

In this embodiment, the photodetectors 12 and 12' for the detections of the focus error signal and the tracking error signal are provided on the same substrate so that the directions of a line dividing the photodetector 12' into two portions is normal to the directions of the two parallel division lines of the photodetector 12. This provision allows the photodetectors 12 and 12' to be independently adjustable irrespective of the photodetectors 12 and 12' being provided on the common substrate. That is, it is possible to accurately obtain the focus error signal and the tracking error signal on the basis of the outputs of the photodetectors 12 and 12' regardless of the provision of the focus error signal detection photodetector 12 and the tracking error signal detection photodetector 12' on one substrate.

With the above-described arrangement, the focus error signal can be obtained on the basis of the outputs of the six portions 12-1 to 12-6 of the photodetector 12, i.e., by $\{(12\text{-}1)+(12\text{-}3)+(12\text{-}5)\}-\{(12\text{-}2)+(12\text{-}4)+(12\text{-}6)\}$ or $(12\text{-}2)-(12\text{-}5)$ where (12-1) to (12-6) represent the outputs of the six portions of the photodetector 12, respectively. The detection sensitivity $\Delta$ of the focus error signal can be expressed by the following equation.

$$\Delta = \frac{fo^2 fc^2 \alpha}{fc^4 - \alpha^2(fo + fc - lo)^2} \quad (1)$$

where fo represents the focal length of the objective lens 6, fc designates the focal length of the detection lens 9, lo depicts the optical path length from the objective lens 6 to the detection lens 9, and $\alpha$ is a value corresponding to $\frac{1}{2}$ of the difference between the optical paths of the upper side beam and the lower side beam illustrated in FIG. 3B.

If $lo = fo + fc$ and fc is extremely greater than o, the above-mentioned equation (1) can be rewritten as follows.

$$\Delta = \left(\frac{fo^2}{fc}\right)^2 \alpha \quad (2)$$

This embodiment is arranged so that the focus sensitivity obtained in accordance with this calculation becomes about 22 micrometers.

According to the above-mentioned equation (2), a further improvement of the focus sensitivity can be achieved by increasing fc or decreasing $\alpha$. However, the increase of fc causes enlargement of the optical system and the decrease of $\alpha$ reduces the beam diameter. In practice, the reduction of the beam diameter is limited up to a predetermined value, for example, 100 micrometers.

This embodiment can reduce the track-crossing noises produced when the laser beam from the objective lens 6 crosses the tracks on the optical disk 7. That is, the direction connecting the portions 12-2 and 12-5 of the photodetector 12 are coincident with the direction of the diffracted light caused by the track of the optical disk 7 due to the focus error signal detection beam. This arrangement causes the track-crossing noise to be reduced.

As a further factor for generation of the track-crossing noise, there is a relation between the track channel and the polarizing direction of the illumination beam. Generally, when the track pitch approaches the wavelength region, the characteristic due to the polarizing direction starts to vary. In the case where the electric field vector of the illumination beam detects in a direction parallel to the channel, the diffraction efficiency becomes great to increase the tracking error signal. However, since the diffraction efficiency of the high-order light similarly becomes great, the level of the track-crossing noise to be introduced into the focus error signal becomes high, making it difficult to reduce the modulation of the focus error signal. On the other hand, when the electric field vector of the illumination beam directs in a direction normal to the channel, the diffraction efficiency is lowered. In this embodiment, under the conditions that the track pitch is 1.6 micrometers, the depth of the channel is $\frac{1}{8}$ of the wavelength which is 780 nm, and the information recording duty ratio on the track is 30 to 50%, in the case of the vertical electric vector, the level of the tracking error signal becomes about 80%. Although it is difficult for the track-crossing noise level is difficult to be below 1 micrometer in the case of the parallel electric vector, it can be reduced to be below 0.5 micrometer in the case of the vertical electric field vector. Thus, for reducing the track-crossing noise level of the optical head device, the electric field vector perpendicular to the track channel is preferable. On the other hand, for increasing the tracking error signal level, the electric field vector parallel to the track channel is preferable.

It is generally considered that, as a method of making the electric field vertical with respect to the track channel, a second half-wave plate 16 is provided between the first polarizing prism 5 and the objective lens 6 as illustrated in FIG. 2. This arrangement is suitable for thickness reduction of the optical system. It is possible that in construction the second half-wave plate 16 is integrally coupled to the first polarizing prism 5, and further in the separation type optical system allowing only the objective lens 6 to be movable in the directions of the optical axis by means of a transferring base, it is possible to additionally use it as a guarding window for preventing dust from being introduced into the optical system. In the separation type optical system, there is a problem that the sensitivity of the focus error signal is varied. However, according to this embodiment, the sensitivity variation is below about 4% under the condition that the transferring distance of the objective lens 6 is about 22 millimeters.

The optical head device illustrated in FIG. 2 can be used as a light-once type optical head device by changing the characteristic of the polarizing film of the first polarizing prism. In this case, the second half-wave plate 16 is required to be changed to a quarter wavelength plate.

Figure 5:
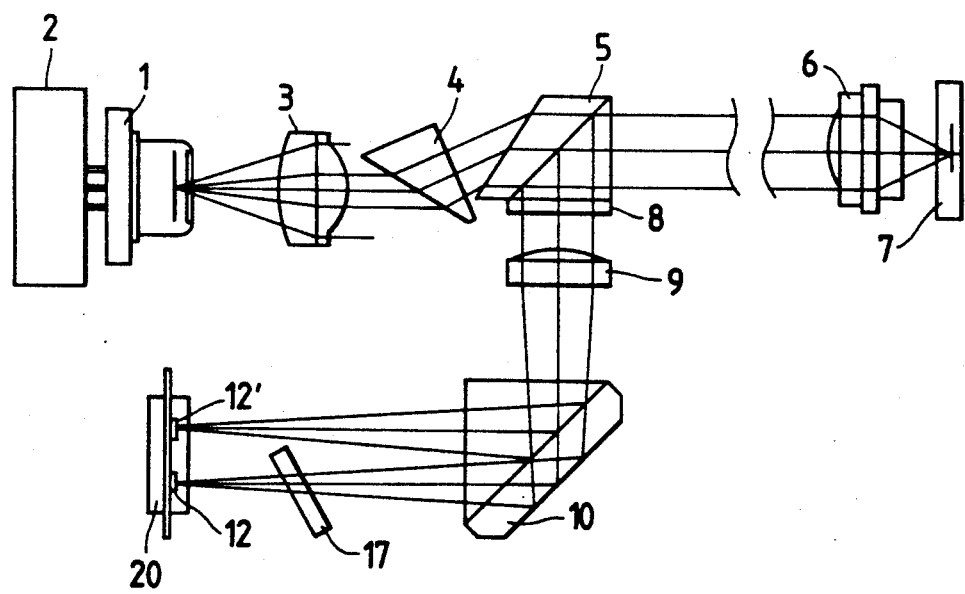
FIG. 5 is an illustration of an optical head device according to a second embodiment of the present invention.

FIG. 5 is an illustration of an optical head device according to another embodiment of the present invention, in which parts corresponding to those in FIG. 2 are marked with the same numerals and the description will be omitted for brevity. In FIG. 5, a light beam reflected from an optical disk 7 passes through a first polarizing prism 5, a half-wave plate 8 and a detection lens 9 and reaches a second polarizing prism 10 to separate the light beam into the S-polarization and the P-polarization. The S-polarization is used for detection of the far-field tracking error signal and the P-polarization is used for detection of the focus error signal in accordance with the astigmatism system. The S-polarization from the second polarizing prism 10 is directed to a photodetector 12' of a photodetector assembly 20. On the other hand, the P-polarization reaches a photodetector 12 of the photodetector assembly 20 through a plane parallel plate 17 whereby the P-polarization generates astigmatism. Here, the photodetector 12 is of the four-division type whereby the focus error signal can be obtained in accordance with the astigmatism method. This arrangement is suitable for the case where the track-crossing noise is of little concern. Here, it is appropriate to use a hologram, a loop-type prism or others as the plane parallel plate 17. Further, in the case of no detection of the far-field tracking error signal, the plane parallel plate 17 is not required with the focus error signal being detected by moving the photodetector assembly 20 along the optical axis.

Figure 6A:
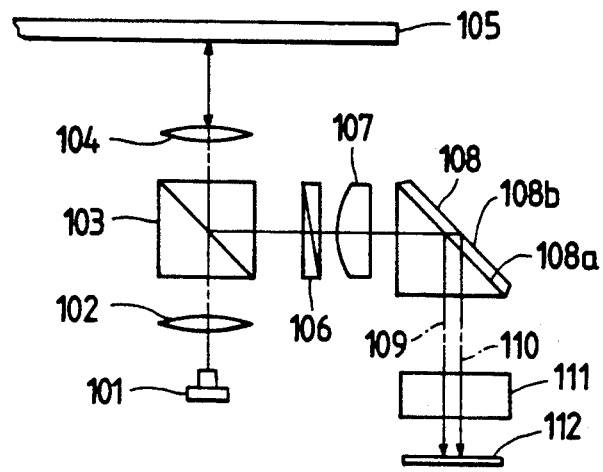
FIGS. 6A to 6C are illustrations of an optical head device according to a third embodiment of this invention.
Figure 6B:
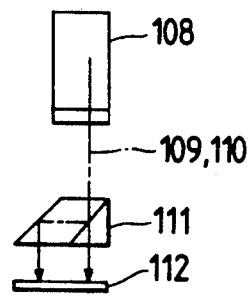
Figure 6C:
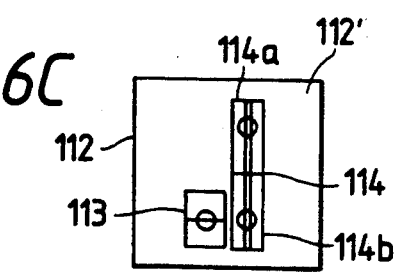

FIG. 6A is an illustration of an optical head device according to a third embodiment of the present invention. In FIG. 6A, a laser beam emitted from a semiconductor laser 101 passes through a collimator lens 102, a first polarizing prism (polarizing beam splitter) 103 and an objective lens 104 and then reaches an optical disk 105. A beam reflected from the optical disk 105 returns to the objective lens 104 and is reflected at the first polarizing prism 103 so as to pass through a half-wave plate 106 and a signal lens 107 and be incident on a second polarizing prism 108. The half-wave plate 106 is provided in order to rotate the polarized direction by 45°. The beam from the half-wave 106, reflects the S-polarization at a polarizing film 108a of the second polarizing prism 108 and the P-polarization passes through the polarizing film 108a and is then reflected at a reflection surface 108b thereof and further passes through the polarizing film 108a thereof. A reflection beam 109 (S-polarization) and a reflection beam (P-polarization) 110 from the second polarizing prism 108 reach a photo-electric converting device 112 through a third polarizing prism 111. FIG. 6B is a cross-sectional view showing the third polarizing prism 111 and FIG. 6C shows an arrangement of the photo-electric converting device including a first light receiving portion 113 and a second light-receiving portion 114. The photo-electric converting device 112, as illustrated in FIG. 6C, comprises a substrate 112' and the first and second light-receiving portions 113 and 114 placed on the substrate 112'. The first light-receiving portion 113 is divided along a line into two portions and the second light-receiving portion 114 comprises two sections 114a and 114b each of which is divided by two parallel lines, extending in parallel to the axis of the section 114a or 114b, into three portions, whereby the second light-receiving portion results in being composed of six portions. The two sections 114a and 114b are successively arranged so that the two parallel division lines of the section 114a are coincident with the two parallel division lines of the section 114b thereof and are coincident with each other. The first light-receiving portion 113 is provided adjacent to one section 114b of the second light-receiving portion 114, and the division line of the first light-receiving portion 113 is arranged to be normal to the two parallel division lines of the second light-receiving portion 114. The third polarizing prism 111 is substantially arranged so that the transmission of the P-polarization is 100%, the transmission of the S-polarization is 50% and the reflection of the S-polarization is 50%. Thus, all of the reflection beam 109 penetrates the third polarizing prism 111 and is incident on the first light-receiving portion 113 of the photo-electric converting device 112, the reflection beam 110 is divided into two portions as illustrated in FIG. 6B and the two divided beams are incident in parallel on the second light-receiving portion 114 of the photo-electric converting device 112.

Figure 7:
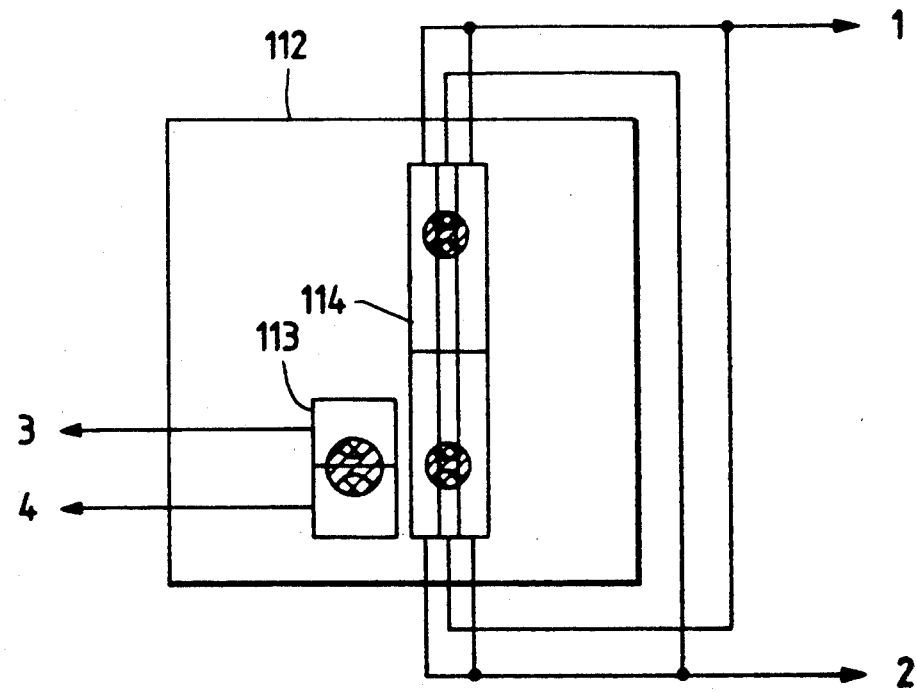
FIGS. 7 and 8 are illustrations for describing the outputs of a photodetector assembly.

The two division beams of the reflection beam 110, as illustrated in FIG. 6C, form two beam spots on the second light-receiving portion 114. The focusing error signal can be obtained on the basis of the outputs of the six portions of the second light-receiving portion 114 in accordance with a well known spot size detection (SSD) technique. That is, with reference to FIG. 7, the focusing error signal can be obtained by the difference between the sum (1) of the outputs of the three portions of the six portions and the sum (2) of the outputs of the remaining three portions thereof. On the other hand, the first light-receiving portion 113 is divided into two portions, and the tracking error signal can be obtained on the basis of the difference between the outputs (3) and (4) of the two divided portions of the first light-receiving portion 113 in accordance with the well known far-field technique. Further, the magneto-optical signal and other information signals can be obtained on the basis of the outputs of the first and second light-receiving portions 113 and 114.

Figure 8:
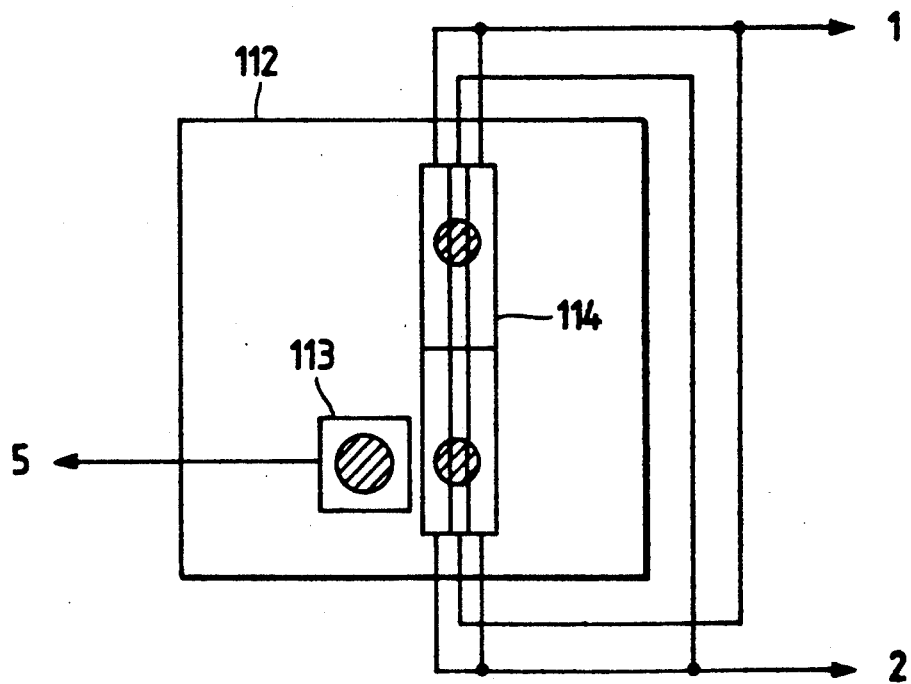

Here, if the tracking control is effected in accordance with the sample servo technique, the photo-electric converting device 112 can be arranged as illustrated in FIG. 8. In this case, the detection of the tracking error signal in accordance with the far-field technique is not required, and therefore it is not necessary to divide the first light-receiving portion 113 into two portions, thereby resulting in a simple structure. The magneto-optical signal can be obtained as (1)+(2)−(5), and the sample servo signal and address information can be obtained on the basis of the result of (1)+(2)+(5).

Figure 9A:
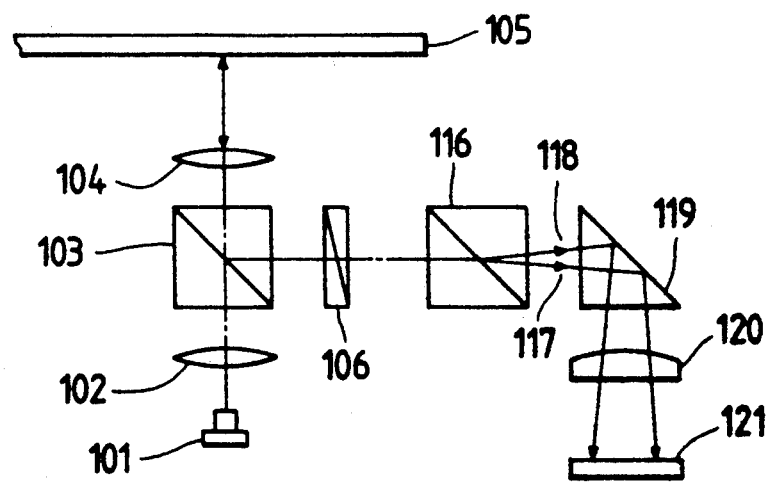
FIGS. 9A and 9B are illustrations for describing an optical head device according to a fourth embodiment of this invention.
Figure 9B:
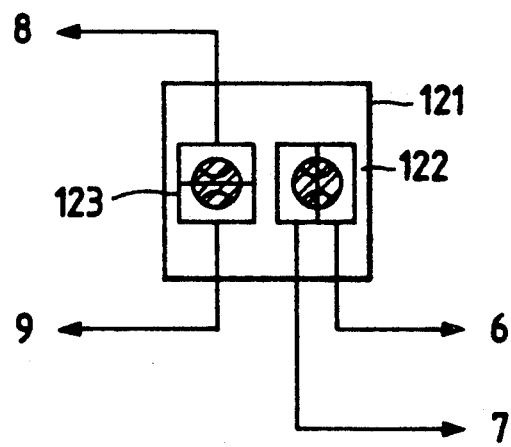

FIG. 9A shows an optical head device according to a fourth embodiment of this invention. Parts corresponding to those in FIG. 6A are marked with the same numerals. In FIG. 9A, a light beam emitted from a semiconductor laser 101 passes through a collimator lens 102, a polarizing prism (polarizing beam splitter) 103 and an objective lens 104 and then reaches an optical disk 105. A beam reflected at the optical disk 105 returns to the objective lens 104 and reaches the polarizing prism 103 so as to be reflected to advance to a half-wave plate 106 which rotates the polarizing direction by 45°. The beam emerging from the half-wave plate 106 is incident on a Wollaston prism 116 so as to be separated into first and second beams 117 and 118. The first and second beams 117 and 118 are full-reflected by a critical angle prism 119 and then pass through a single lens 120 to reach a photo-electric converting device 121 comprising a first light-receiving portion 122 and a second light-receiving portion 123 as illustrated in FIG. 9B. The first beam 117 is incident on the first light-receiving portion 122 and the second beam 118 is incident on the second light-receiving portion 123. Each of the first and second light-receiving portions 122 and 123 is divided into two portions and the division lines of both the first and second light-receiving portions 122 and 123 are arranged to be normal to each other.

The first beam 117 to be full-reflected by the critical angle prism 119 is arranged to be incident on the critical angle prism 119 with the critical angle with respect to the full-reflection surface of the critical angle prism 119 when the optical head device is in the focus state with respect to the optical disk 105. Further, the second beam 118 is incident thereon with an angle slightly smaller than the critical angle with respect to the full-reflection surface, and therefore, when the optical head device is in the focus state with respect thereto, the second beam 118 is full-reflected thereat. With this arrangement, the focusing error signal can be obtained in accordance with a known critical angle method. That is, with reference to FIG. 9B, the focusing error signal is detected on the basis of the difference between the outputs (6) and (7) of the first light-receiving portion 122. On the other hand, the tracking error signal can be obtained on the basis of the difference between the outputs (8) and (9) of the second light-receiving portion 123. Moreover, the magneto-optical information signal can be obtained as (6)+(7)−(8)−(9) and the address information signal can be obtained as (6)+(7)+(8)+(9). This arrangement can make simple the arrangement of the optical head device as compared with the arrangement of the third embodiment.

Figure 10A:
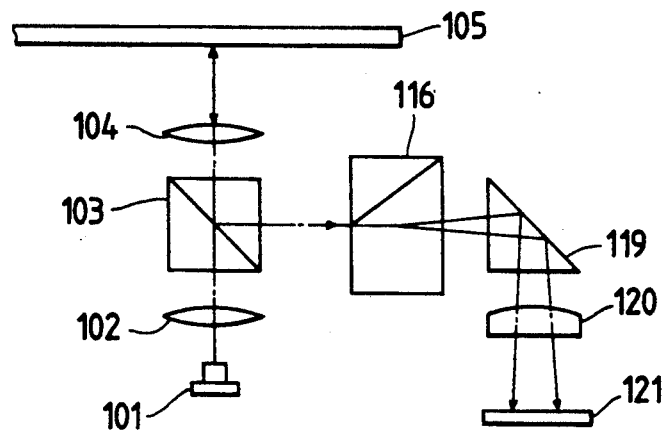
FIGS. 10A and 10B show a modification of the optical head device illustrated in FIGS. 9A and 9B.
Figure 10B:
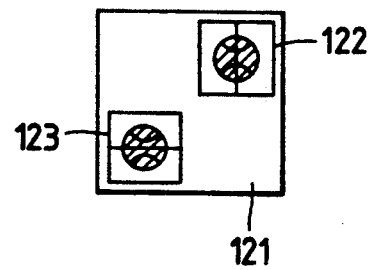

Although in the fourth embodiment the half-wave plate 106 is provided between the Wollaston prism 116 and the polarizing prism 103, it is also appropriate to remove the half-wave plate 106 as illustrated in FIG. 10A. In this case, the Wollaston prism 116 is required to be rotated by 45° and hence the first and second light-receiving portions 122 and 123 are positioned as illustrated In FIG. 10B.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. An optical head device for optically recording and reproducing information on and from an optical recording medium, comprising:

light source means for emitting a light beam;
collimator means for causing said light beam from said light source means to become a parallel light beam;
objective lens means for converging said parallel light beam from said collimator means on said optical recording medium;
first optical means provided between said collimator means and said objective lens means for reflecting the light beam returned from said optical recording medium;
converging means for converging the light beam reflected by said first optical means;
second optical means for separating the light beam from said converging means to generate two light beams which are optically cross-polarized, said two separated light beams directing in the substantially same direction and being separated by a predetermined distance from each other, said second optical means being arranged to cause the optical path length of one of said two separated light beams to be longer than that of the other separated light beam; and
photodetector means for respectively receiving the two separated light beams from said second optical means.

2. An optical head device for optically recording and reproducing information on and from an optical recording medium, comprising:

light source means for emitting a light beam;
collimator means for causing said light beam from said light source means to become a parallel light beam;
objective lens means for converging said parallel light beam from said collimator means on said optical recording medium;
first optical means provided between said collimator means and said objective lens means for reflecting the light beam returned from said optical recording medium;
converging means for converging the light beam reflected by said first optical means;
second optical means for separating the light beam from said converging means to generate two light beams which are optically cross-polarized, said two separated light beams directing in the substantially same direction and being separated by a predetermined distance from each other;
photodetector means for respectively receiving the two separated light beams from said second optical means;
third optical means provided between said second optical means and said photodetector means for dividing one of the two separated light beams from said second optical means into two light beams which are separately incident on said photodetector means and for transmitting the other separated light beam which is directly incident thereon.

3. An optical head device as claimed in calim 2, wherein said third optical means is arranged so that the optical path length of one of the two divided light beams is longer than that of the other divided light beam.

4. An optical head device as claimed in claim 2, wherein said photodetector means is composed of a substrate and first and second light-receiving portions placed on said substrate, said first light-receiving portion being divided along a line into two portions and said second light-receiving portion comprises two sections each of which is divided along two parallel lines into three portions, said first and light-receiving portions are provided such that the division line of said first light-receiving portion is perpendicular to the two parallel division lines of said second light-receiving portion.

5. An optical head device as claimed in claim 4, wherein said first light-receiving portion receives the other separated light beam emerged from said second optical means and passing through said thrid optical means, and said second light-receiving portion receives the two divided light beams obtained by dividing the one separated light beam from said second optical means by means of said third optical means into two.

6. An optical head device for optically recording and reproducing information on and from an optical recording medium, comprising:

light source means for emitting a light beam;
collimator means for causing said light beam from said light source means to become a parallel light beam;
objective lens means for converging said parallel light beam from said collimator means on said optical recording medium;
first optical means provided between said collimator means and said objective lens means for reflecting the light beam returned from said optical recording medium;
converging means for converging the light beam reflected by said first optical means;
second optical means for separating the light beam from said converging means to generate two light beams which are optically cross-polarized, said two separated light beams directing in the substantially same direction and being separated by a predetermined distance from each other;
photodetector means for respectively receiving the two separated light beams from said second optical means;
third optical means provided between said second optical means and said photodetector means for causing one of the two separated light beams from said second optical means to generate astigmatism.

7. An optical head device for optically recording and reproducing information on and from an optical recording medium, comprising:
- light source means for emitting a light beam;
- collimator means for causing said light beam from said light source means to become a parallel light beam;
- objective lens means for converging said parallel light beam from said collimator means on said optical recording medium;
- first optical means provided between said collimator means and said objective lens means for reflecting the light beam returned from said optical recording medium;
- second optical means for separating the light beam from said first optical means to generate two light beams which are optically cross-polarized to each other;
- third optical means for reflecting the two separated light beams so as to direct in the substantially same direction after reflected, said third optical means being arranged such that one of the two separated light beams assumes a critical angle with respect to a reflection surface thereof; and
- photodetector means for respectively receiving the two separated light beams from said third optical means.

8. An optical head device as claimed in claim 7, wherein said photodetector means comprises first and second light-receiving portions each of which is divided into two portions or more, the division line of said first light-receiving portion being arranged to be perpendicular to that of said second light-receiving portion, said first light-receiving portion receiving one of the two separated light beams from said third optical means and said second light-receiving portion receiving the other separated light beam therefrom.

* * * * *

UNITED STATES PATENT AND TRADEMARK OFFICE
CERTIFICATE OF CORRECTION

PATENT NO. : 5,151,889
DATED : September 29, 1992
INVENTOR(S) : Tetsuo Saimi, et al.

It is certified that error appears in the above-identified patent and that said Letters Patent is hereby corrected as shown below:

On the title page, Item [75] and Column 1, line 1

Please correct the title of the invention to read
--OPTICAL HEAD DEVICE USING CROSS-POLARIZED BEAMS FROM A LIGHT SOURCE FOR USE IN OPTICAL DISK SYSTEM--.

Signed and Sealed this

Fourteenth Day of September, 1993

Attest:

BRUCE LEHMAN

*Attesting Officer*  *Commissioner of Patents and Trademarks*